United States Patent [19]

Victorian

[11] Patent Number: 5,247,718
[45] Date of Patent: Sep. 28, 1993

[54] TOOTHBRUSH WITH REPLACEABLE BRISTLE HEAD

[76] Inventor: Sherrynne O. L. Victorian, 4545 Louetta #3003, Spring, Tex. 77388

[21] Appl. No.: 960,338

[22] Filed: Oct. 13, 1992

[51] Int. Cl.$^5$ .............................................. A46B 9/04
[52] U.S. Cl. .................... 15/167.1; 15/176.5; 15/178; 15/176.6; 15/176.1; 403/257
[58] Field of Search .................. 15/167.1, 176.1, 176.4, 15/176.5, 176.6, 173, 178; D14/104–113; 403/256, 257, 261, 341

[56] References Cited

U.S. PATENT DOCUMENTS

| | | | |
|---|---|---|---|
| 1,435,641 | 11/1922 | Hines | 15/176.5 |
| 1,800,993 | 4/1931 | Funk | 15/176.5 |
| 2,668,973 | 2/1954 | Glaza et al. | 15/176 |
| 4,890,349 | 1/1991 | Nitzsche | 15/176.5 |

FOREIGN PATENT DOCUMENTS

| | | | |
|---|---|---|---|
| 50639 | 9/1935 | Denmark | 15/176.4 |
| 2311043 | 9/1974 | Fed. Rep. of Germany | 15/176.4 |
| 384303 | 4/1908 | France | 15/176.5 |
| 334346 | 9/1936 | Italy | 15/176.1 |
| 509061 | 5/1957 | Italy | 15/176.4 |

Primary Examiner—Chris K. Moore
Assistant Examiner—Gary K. Graham
Attorney, Agent, or Firm—Robert K. Rhea

[57] ABSTRACT

A disposable bristle toothbrush is formed by an elongated aperture in the head end portion of the toothbrush handle which removably receives a bristle bearing insert which is snapped into and out of place in the aperture of the toothbrush head in one embodiment.

In another embodiment, an elongated U-shaped clip is hingedly connected with the end of the toothbrush head opposite its handle for vertical pivoting movement of the legs of the U-shape toward and away from the bristle bearing insert and in gripping relation with the opposite sides of the toothbrush handle.

1 Claim, 1 Drawing Sheet

TOOTHBRUSH WITH REPLACEABLE BRISTLE HEAD

This invention relates to toothbrushes and more particularly to a toothbrush handle constructed for removably receiving bristle bearing toothbrush inserts.

BACKGROUND OF THE INVENTION

1. Field of Invention

It is well known that a toothbrush which is used regularly accumulates unused paste at the base of the bristles which tends to harbor germs and is generally contributes to bad dental hygiene.

The accumulation of unused dentifrice at the base of the bristles shortens the period of usefulness of the toothbrush and addition to being detrimental to good dental hygiene, results in the toothbrush losing its effectiveness in cleaning the teeth.

This invention provides a toothbrush handle having an aperture at one end for removably receiving a bristle equipped toothbrush insert, permitting the owner to change toothbrush inserts each time the teeth are brushed.

2. Description of the Prior Art

Prior patents generally disclose elongated grooves which may be channel-like in the brush end of a toothbrush handle for removably receiving a toothbrush bristle head.

U.S. Pat. No. 2,668,973 is an example of such prior toothbrush removable bristle heads.

Prior patents including the above named patent disclosing removable bristle heads for toothbrush handles generally feature one part moved relative to another in the toothbrush handle to accept and release bristle heads which contributes to unused paste build-up and thus a harboring of germs.

This invention eliminates this disadvantage by providing an aperture in the end of a toothbrush handle into which a bristle bearing insert is snapped into place and manually snapped out of the toothbrush handle when it is to be replaced without interconnected parts moving relative to each other.

SUMMARY OF THE INVENTION

In one embodiment, a generally conventional elongated toothbrush handle having a head portion provided with a longitudinal extending aperture having the wall surface defining the aperture forming a concave groove, in cross section, coextensive with the perimeter of the aperture.

The removable insert includes a rectangular planar platform cooperatively dimensioned to receive the handle aperture and having a convex, in transverse section, wall surface cooperatively received by the aperture in the toothbrush handle.

In a second embodiment, the aperture in the toothbrush handle is provided with a beveled wall and the rectangular brush equipped platform is similarly provided with a cooperating beveled perimeter. A U-shaped bristle head clip is hingedly connected to the head end of the toothbrush handle and overlies the removable bristle insert in the toothbrush handle aperture. The free end portion of the clip legs resiliently grip the opposing sides of the toothbrush handle to maintain the bristle insert in place during use.

The principal object of the invention is to provide a toothbrush constructed and arranged so that the bristle head insert may be easily and quickly removed from the handle and replaced with another like insert, thus providing a sanitary arrangement in which the repeated use of toothbrush bristles is avoided.

Another object of this invention is the provision of a toothbrush having a handle, including a resilient gripping portion adapted for maintaining the bristle bearing insert in a rigid position and permitting the bristle insert to be easily removed from the toothbrush handle head and replaced by another like bristle insert.

DESCRIPTION OF THE PREFERRED EMBODIMENTS

Figure 1:
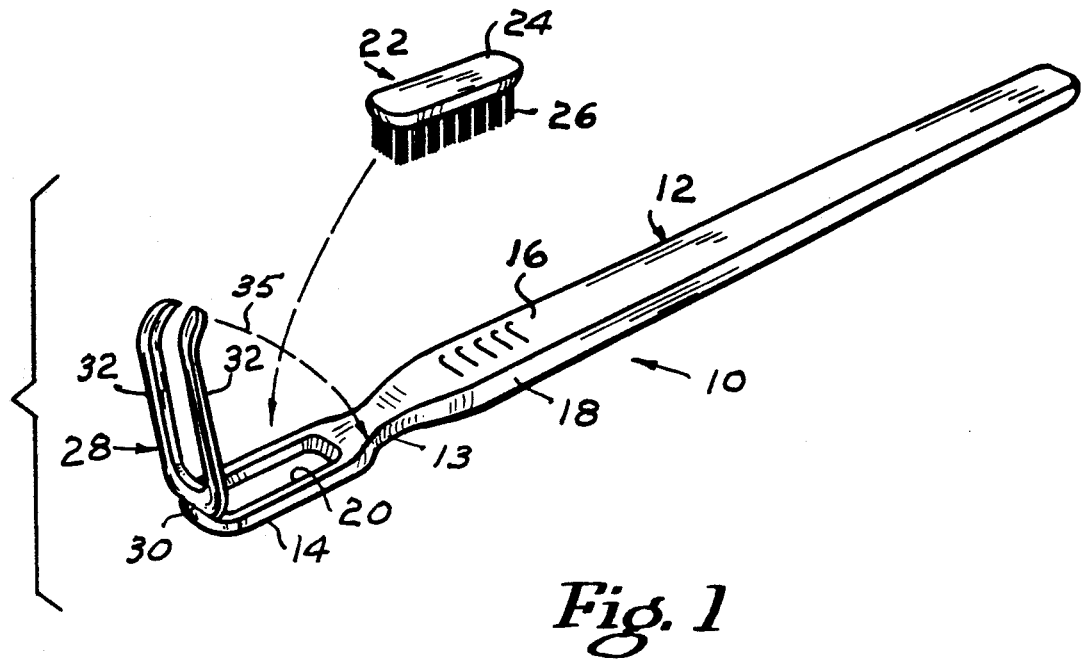
FIG. 1 is an exploded perspective view of one embodiment of the toothbrush; and, FIG. 2 is a similarly exploded perspective view of a second embodiment of the toothbrush.

Like characters of reference designate like parts in those figures of the drawings in which they occur.

In the drawings:

Referring first to FIG. 1, the reference numeral 10 indicates a toothbrush handle of generally conventional configuration having a handle portion 12, a neck portion 13 and a head portion 14.

The handle portion 12 is elongated and defined by generally parallel top and bottom surfaces 16, only the top surface 16, being shown, and opposing side surfaces 18, only one being shown.

The head portion 14, disposed at one end of the handle is substantially equal in width with the handle and of a desired relatively thin thickness, for the purpose presently apparent.

The head portion is generally rectangular and is provided with a central elongated aperture 20, dimensioned to cooperatively receive a removable bristle equipped insert or head indicated generally at 22. The wall defining aperture 20 is tapered so that it converges downwardly, as viewed in FIG. 1.

Similarly the bristle holding platform 24 is provided with a perimeter wall which converges downwardly toward its bristles 26, as viewed in FIG. 1, in cooperative relation with respect to the tapered surface of the aperture 20 so that the bristle platform 24 is snugly seated in the aperture when manually placed therein.

The bristle insert 22 also includes a plurality of bristle tuffs 26, of a selected length, embedded at one end portion in one planar surface of the platform 24 as is conventional with toothbrushes.

The toothbrush handle 10 is further equipped with a bristle head holding clip 28, hingedly connected as at 30 to the end of the head 14 opposite the handle 12 for vertical pivoting movement toward and away from the toothbrush head 14 in overlying relation with respect to the removable bristle insert 22.

The clip 28 is U-shaped and characterized by a pair of parallel legs 32, each having its end portions 34 opposite the hinge accurately turned in a lateral direction with respect to the plane of the legs 32 so that the end portions 34 are disposed downwardly and in gripping relation on opposing sides of the toothbrush handle neck 13 when the clip is moved in the direction of the arrow 35 for the purpose of maintaining the bristle insert 22 in the aperture 20.

Figure 2:
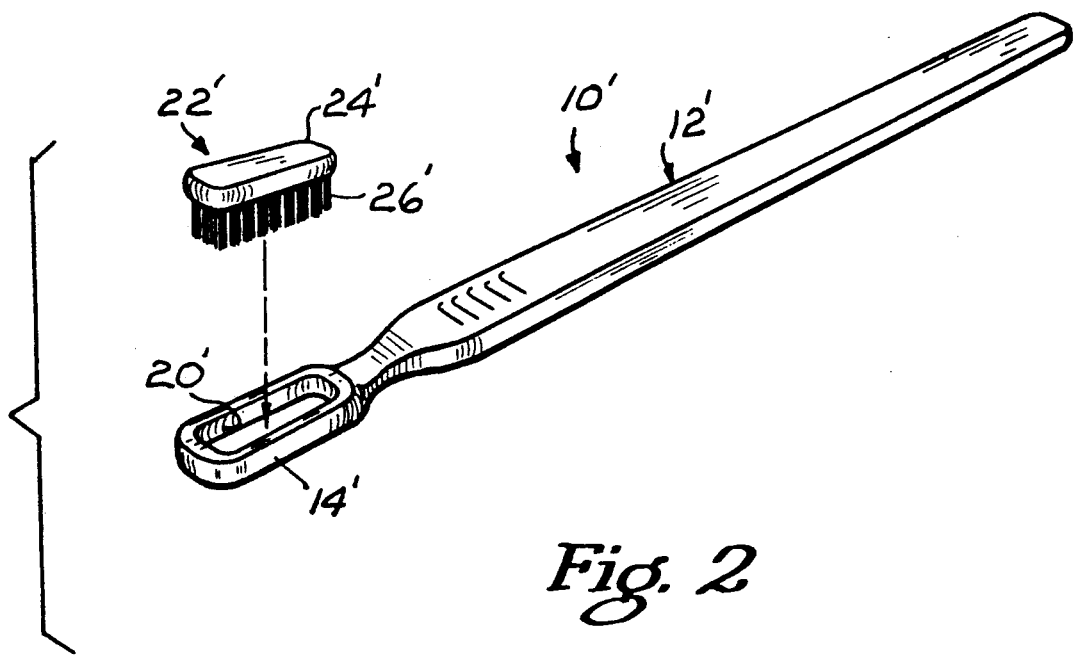

Referring also to FIG. 2, another embodiment of the toothbrush handle is illustrated at 10′ in which the handle portion 12' is substantially identical with the handle 12 of the embodiment 10.

The head portion 14' is similarly provided with an elongated aperture 20' in which the surface defining the aperture is transversely concave.

The bristle insert 22' is substantially identical with the bristle insert 22 of FIG. 1, with the exception that the perimeter of the brush holding platform 24' is characterized by a convex perimeter, in transverse section, snugly received by the aperture 20' when the platform 24' is manually forced into the aperture in a snap action.

In use, the toothbrush 10 and its removable bristle insert are manually assembled as described hereinabove. After using the toothbrush 10 the clip 28 is manually released from the handle neck portion 13 and the bristle insert 22 manually forced out of the aperture 20 by pressing on the bristles 26 for cleansing or replacement of the bristle insert 22 with a new identical one.

Similarly in the embodiment 10', after use, the bristle insert 22' is manually forced out of the aperture 20' as by pressing on the bristle holding platform 24' while holding the head 14'.

Obviously the invention is susceptible to changes or alterations without defeating its practicability. Therefore, I do not wish to be confined to the preferred embodiment shown in the drawings and described herein.

I claim:

1. A toothbrush comprising:

an elongated member having a top surface, a bottom surface and opposing side surfaces, said member having a transversely reduced neck portion adjacent one end to define an elongated handle portion and a head portion, said head portion having an elongated aperture therein defined by a wall converging downwardly from the handle top surface to the bottom surface for forming a toothbrush bristle insert seat;

a toothbrush bristle insert defined by a platform having opposite planar surfaces and having a plurality of elongated toothbrush bristles imbedded at one end in of said surfaces of the platform, said platform having a perimeter edge surface converging toward its bristle containing planar surface, said edge surface cooperating with and seating on said seat such that said bristles project downwardly from said head portion; and, an elongated U-shaped clip normally overlying said platform for holding said bristle insert seated on said seat, said clip having a bight portion with two elongated legs extending therefrom, each having a free end portion, said bight portion hingedly connected with said head portion opposite said handle portion to allow vertical pivoting movement of said legs toward and away from said head portion, said legs straddling and resiliently gripping, at their end portions opposite the hinged connection, opposing side surfaces of the neck portion.

* * * * *